July 20, 1971 — T. V. DE PALMA ET AL — 3,594,131

CATALYTIC CONVERTER

Filed Nov. 10, 1969

INVENTORS:
Ted V. DePalma
Martin W. Perga

BY: *James R. Hoolson, Jr.*
*Philip T. Liggett*

ATTORNEYS 3,594,131
CATALYTIC CONVERTER
Ted V. De Palma, Roselle, and Martin W. Perga, Hoffman Estates, Ill., assignors to Universal Oil Products Company, Des Plaines, Ill.
Filed Nov. 10, 1969, Ser. No. 875,279
Int. Cl. F01n 3/00, 3/14
U.S. Cl. 23—288                                7 Claims

ABSTRACT OF THE DISCLOSURE

A converter for catalytic conversion of fluid streams which embodies a catalyst retaining section having a reservoir section therein. The reservoir section is established by a partition that prevents flow of fluid through one part of the catalyst section. A flanged end of a movable perforate partition spans the catalyst bed and keeps all the catalyst material in a compacted state. In a preferred embodiment, a weighted bullet-shaped distribution means provides the pressuring means for keeping the flanged end in pressure contact with the catalyst material. As catalyst material shrinks or is lost by mechanical attrition or chemical spallation, the flanged end of the movable perforate partition forces fresh material from the reservoir section to an area of the bed where fluid flow exists. In a modified embodiment, the movable perforate partition exposes additional catalyst material to fluid flow at the other end of the catalyst section as catalyst material is lost.

---

The present invention is directed to an improved catalytic converter for use in the catalytic conversion of fluid streams. Although not to be considered limiting, the particular design of the present invention makes its use particularly adaptable for conversion of exhaust gas streams of automobiles.

It has been found that one of the difficulties encountered in the utilization of catalytic converters for effecting the catalytic conversion of fluid streams arises because of the generally high temperatures encountered within a converter, especially in an oxidation reaction. These high temperatures may be produced as a result of the exothermic oxidation reactions taking place within and around the catalyst bed. The converter disclosed herein embodies a design that provides for equalization of thermal stresses, whereby differential stresses within its walls are kept well within the elastic limit of the material of construction.

The high temperatures inherent in the operation of a converter creat a problem also due to thermal expansion. This problem relates to the relative expansion of the components in relation to the expansion of the catalyst material within the converter. In other words, metals generally have a higher coefficient of expansion than catalyst material used within a converter. Thus, when the temperature of the catalyst material and the temperature of the metal used for the components of the converter rise, they will expand. However, since generally the coefficient of expansion of a catalyst material is not as great as the coefficient of expansion of a metal, their relative expansion will be different. The catalyst material will, in relation to the size of the converter, "shrink," in effect. When "shrinkage" occurs, there is a tendency for fluids to bypass voids caused by the shrinkage. The present invention provides a means by which voids within the catalyst section are eliminated by providing a reservoir therein. Of course, such a reservoir will also fill voids created within the converter by mechanical attrition and/or chemical spallation of the catalyst material.

Reservoirs for converters are not new in themselves. Normally, they are provided on the high side of the catalyst section in a converter. Communication passageways are provided from the reservoir to the main body of the catalyst section. These passageways usually take the form of holes in partitions separating the catalyst section from the catalyst reservoir. If the loss of catalytic volume is caused by thermal expansion of the components and catalyst material "shrinkage," then this arrangement may cause another problem. That is, as the converter begins to cool, the relative "shrinkage" becomes relative "expansion." Now, instead of a gravity feed through the communicating passageways, the feed of the catalyst material back into the reservoir is brought about via "expansion" of the catalyst material. The partitions separating the catalyst section from the reservoir may, in such an arrangement, act as a constriction preventing the catalyst material from returning into the reservoir. This, in turn, may cause crushing of catalyst material, thus compounding the problems of shrinkage, since crushed catalyst material may be lost. The particular arrangement of the reservoir will eliminate any such problem.

Another problem usually found in converters, especially those used in automobile systems, is that of contamination and lower efficiency as the age of the converter increases. While not attempting to attack the problem of contamination, one embodiment of the present invention provides a means by which any loss of catalyst material within the catalyst section will actually increase the surface area of catalyst material contacting the incoming fluid. Thus, this particular arrangement will tend to increase the efficiency of the system, since the actual size of the catalyst bed will become larger as the converter ages. This added efficiency will tend to negate the reduced efficiency caused by contamination of catalyst material.

Thus, it is a principal object of this invention to provide a catalytic converter for catalytic conversion of a fluid stream that prevents bypass of fluids not treated therein.

More specifically, it is an object of this invention to provide for a catalytic converter for catalytic conversion of a fluid stream that embodies a catalyst reservoir therein for containment of fresh catalyst particles to fill voids created by relative "shrinkage," mechanical attrition, chemical spallation, etc.

It is also an object of this invention to provide for a catalyst converter for catalytic conversion of a fluid stream which embodies a catalyst reservoir that does not, in itself, cause a problem of mechanical breakdown or crushing of catalyst material.

It is a further object of this invention to provide a catalytic converter for catalytic conversion of a fluid stream which is constructed in such a manner that the various components will be capable of expanding and contracting relative to each other as the temperature of the apparatus fluctuates.

Still further, it is an object of this invention to provide for a catalytic converter for catalytic conversion of a fluid stream with a catalyst section that increases in size as material therein is lost by attrition, shrinkage, or spallation.

In a broad aspect, the present invention provides for a converter for catalytic conversion of a fluid stream comprising in combination, an outer housing, a fixed perforate partition disposed within said outer housing, a movable perforate partition spaced from said fixed perforate partition and having at least one flanged end thereon, which extends adjacent to said fixed perforate partition, a fixed blocking partition disposed adjacent said movable perforate partition in proximity to said flanged end, said fixed blocking partition overlapping a portion of said movable perforate partition to thereby block flow of said fluids through the overlapped portion thereof, end closure means for the space encompassed between said perforate partitions to define a catalyst retaining section adapted to hold catalyst particles, fluid inlet passageway means into said housing and into communication with one perforate face of said catalyst section and a fluid outlet passageway means from said housing in communication with the opposing perforate face of said catalyst retaining section, and pressuring means contacting said movable perforate partition to maintain said flanged end in pressure contact with said catalyst material, whereby said catalyst material is maintained in a compacted state.

In a preferred embodiment, the outer housing is frustraconically shaped, and the internal components are basically cylindrically shaped and coaxially disposed within the outer housing. In addition, these internal components are connected to the housing in an independent manner. This symmetrical shape will end to eliminate stresses due to temperature differentials in the lateral direction, and the independent connection of the components will allow them to expand relative to each other in the longitudinal direction, thus alleviating possible longitudinal stresses caused by temperature differentials in the structure. Preferably, to simplify the working parts within the converter, the converter is utilized in a substantially vertical position with the flanged end of the movable perforate partition positioned at the top. In this way, the weight of the movable perforate partition in itself will serve as the pressuring means maintaining the flanged ends of the movable perforate partition in pressure contact with the catalyst material in the catalyst retaining section. One embodiment adds additional weight to the movable perforate partition by the insertion and connection of a weighted bullet-shaped distribution means to the movable perforate partition. When the converter is not vertically disposed, the pressuring means may comprise, for example, a spring contacting the outer housing and the movable perforate partition. The spring, of course, would be biased to maintain the flanged end in pressure contact with the catalyst material.

In a modified embodiment, a perforate closure partition is located at the end opposite the flanged end of the movable perforate partition, and the movable perforate partition is closed at that end. Thus, as the movable perforate partition moves to take up voids created by attrition, etc., more of the closure partition is exposed to the space within the movable perforate partition. Since the closure partition is perforated, more of the catalyst material is exposed to fluid flow.

The design and construction of the present improved converter, as well as other advantageous features in connection therewith, are better set forth and explained by reference to the accompanying diagrammatic drawing and the following description thereof.

Figure 1:
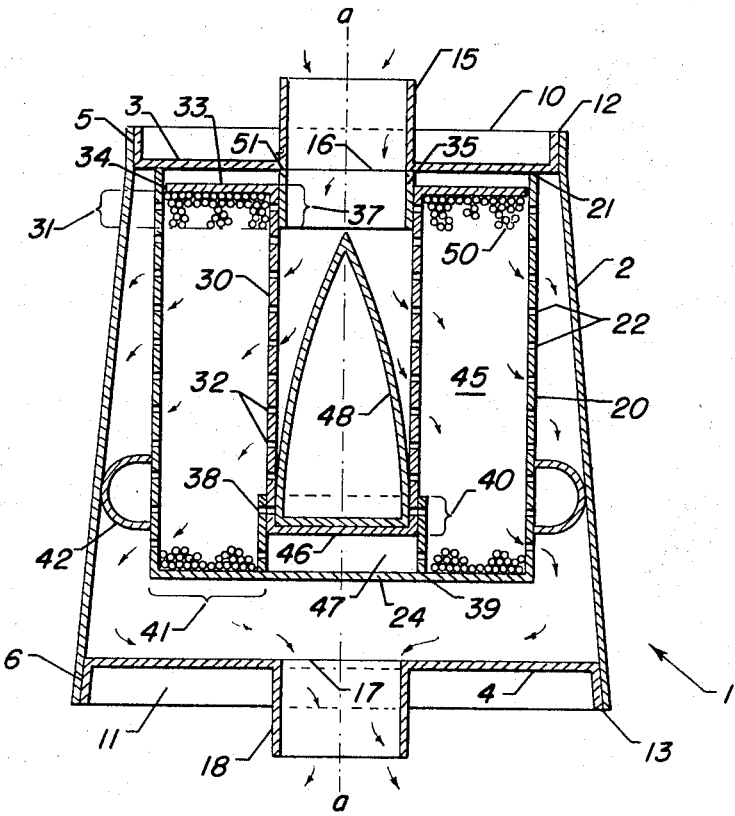
FIG. 1 of the drawing is a sectional elevational view through a preferred symmetrical embodiment of the converter of this present invention.

Referring now more particularly to FIG. 1, there is shown in cross section the elongated outer housing 1, which comprises a frustra-conically shaped elongated tubular section 2 having a longitudinal axis a—a, and end sections 3 and 4. The frustra-conical shape of tubular section 2 should not be limiting upon this present improvement, for other shapes are contemplated, such as the rectangular one ilustrated in FIG. 2 which is to be described hereinafter.

In the present embodiment, the edges of end sections 3 and 4 are turned outwardly at 10 and 11, respectively. Thus, there are provided peripheral flanged surfaces for abutting the interior of tubular section 2 at 5 and 6. It is noted that the type of connection resulting from the use of end sections 3 and 4 will permit the utilization of various production techniques to seal the connection either permanently or temporarily. For example, such an arrangement will permit the use of welding, either by establishing edge joint welds at 12 and 13, or by establishing a joint at 5 and 6 through the use of resistance welding techniques. It is also contemplated that this connection be sealed by use of a clamping device, either temporarily or permanently. Still further, the connection may be sealed by turning and rolling the two mating surfaces inwardly or outwardly to produce a "tin can" type joint connection. On the other hand, it is contemplated that end sections 3 and 4 may be the flat plates, thus permitting a simple weld connection to section 2. It is also contemplated that section 2 may be flanged to facilitate various types of connections.

The symmetrical construction of this particular embodiment is considered to be a preferred construction. To maintain this symmetrical construction, a conduit 15 is located along axis a—a and communicates with the interior of outer housing 1 via opening 16. Likewise, a conduit 18 is disposed along axis a—a on end section 4, and an opening 17 is provided in section 4 to establish communication into the interior of outer housing 1.

A cylindrically shaped fixed perforate section 20 is disposed coaxially on axis a—a. It is attached to outer housing 1 at 21. Apertures or slotted openings 22 are provided in the walls of fixed perforate section 20, thereby establishing communication therethrough. Partition 20 has a closed end 24 which is spaced from outer housing 1. Coaxially located on axis a—a and within fixed perforate partition 20 is movable perforate partition 30 which is also cylindrically shaped. It has apertures or slotted openings 32 therein to provide communication therethrough. Movable partition 30 has a flanged end 33 which extends adjacent to the fixed perforate partition at 34. A fixed cylindrically shaped blocking partition 35 is disposed coaxially on axis a—a adjacent to movable perforate partition 30 in proximity to flanged end 33. The blocking partition overlaps a portion of the movable perforate partition to block flow of fluids through the overlapped portion 37 and thus it forms a reservoir zone 31. Blocking partition 35 also serves as a guide for movable perforate partition 30. To completely define the catalyst section, a fixed cylindrically shaped perforate closure partition 38 is coaxially disposed around the movable perforate partition 30 and is attached to end section 24 at 39. It overlaps partition 30 through zone 40. Partition 38 and portion 41 of end section 24 define the end closure means for the catalyst retaining section. Thus, the catalyst retaining section 45 is defined by the fixed perforate section 20, movable perforate section 30, flanged portion 33, end portion 41, and closure partition 38. It is to be noted that movable section 30 is free to slide around blocking partition 35 and end closure partition 38. Within catalyst section 45 are located subdivided catalyst material 50. In a filled condition, the catalyst material 50 maintains the movable perforate partition 30 in a position as shown in FIG. 1.

With regard to the catalyst, it is not intended to limit this improved type of catalytic converter to any one particular type of catalyst. Inasmuch as there are various known effective and efficient catalyst compositions for use with specific reactions. For example, suitable oxidation catalyst for use in reducing exhaust gases of an internal combustion engine include metals of Groups I, V, VI, VII, and VIII of the Periodic Table, particularly chromium, copper, nickel, and platinum. These components may be used singly, or in combinations of two or more, etc., and will generally be composited with an inorganic refractory oxide support material, such as alumina, silica-alumina, silica-alumina-zirconia, silica-thoria, silica-boria, or the like.

It is not intended to limit this invention to any particular physical shape of catalyst material. The physical shape may be such that they are in the form of spheres, cylinders, or pellets, typically having a dimension of onesixteenth to one-quarter inch, although larger particles or smaller particles may be employed where desirable. Mixed sizes of catalyst material may also be well utilized especially as a means to provide for a low temperature catalytic oxidation process. Also, the catalytic material may be in the form of impregnated fibers which, in turn, may be placed in a mat-like bed arrangement. It is also contemplated that the catalytic material be formed into a rigid material corresponding to that of the catalyst section.

In the present preferred embodiment, the movable perforate partition has a closed end 46. The closed end prevents fluids from flowing in region 47 and thus through the non-overlapped portion of closure partition 38. It is to be noted that if partition 38 were of an imperforate design or if flow through partition 38 were designed at all times, which is contemplated to be within the scope of this invention, the need for closed end 46 would not be absolutely necessary. Closed end 46 also serves as a support for a distribution means 48 which is basically of a bullet shape. This particular shape is utilized in this particular converter to provide for uniform flow through the catalyst section. Distribution means 48 also provides added weight to act as a pressuring means. In other words, since distribution means 48 contacts the movable perforate partition via closed end 46, it will help maintain the flanged end 33 in pressure contact with the catalyst material 50 to thereby maintain it in a compacted state. As catalyst material is lost through relative "shrinkage," chemical spallation, or mechanical attrition, the weight or pressuring means will cause the flanged end 33 to move downward to thereby maintain the material in the same compacted state. Since the movable partition 30 is being lowered as material is lost in the catalyst section, fresh catalyst material in the reservoir zone 31 will be forced into contact with fluid flow. Also, since movable partition 30 is moving downward, it will expose more of closure partition 38. Thus, the overlapped portion 40 will become larger and in effect the catalyst retaining section will be enlarged.

It is to be noted that the internal components of the converter of FIG. 1 are only fixed permanently to the outer housing at 21 and 51. The lower portion of these components are not supported in any fixed manner to the outer housing. They are, however, supported in a slideable manner by transverse projections or other suitable spacing means 42 spaced around the circumference of the interior of section 2 and spaced from the bottom of section 3. These projections have been shown to be formed by attaching separate pieces of material to fixed perforate partition 20; however, this particular form of fabrication should not be considered limiting for other forms of spacers are considered to be within the scope of the present design. For instance, the projections may be formed by a stamping operation. It should also be recognized that the number of projections used for the purpose of supporting the lower end of the inner components should not be limiting upon this invention. However, the number should not be so great as to block flow of fluid thereby. Typically, three or four such projections spaced equidistant around the fixed perforate partition 20 will provide adequate guide and support for those components. It is also noted that the movable perforate partition 30 is free to expand in a longitudinal direction. This particular construction allows for free longitudinal expansion of all the components therein and prevents stresses from building in any one area of the converter.

In the operation of the converter, the fluid is preferably directed into conduit 15 and through opening 16 provided in the end plate 3 to impinge upon the distribution means 48. Passing down over the distribution means, a high fluid velocity will tend to develop into a uniform pressure head, because of the general taper inherent in the bullet-shaped distribution means. The fluid stream is then directed through perforations 32 of the movable perforate partition 30 into the catalyst retaining section 45. The reactants of the fluid are then chemically reduced or combined within the catalyst section. Next, the fluid passes through perforations 22 of fixed perforate partition 20 into the manifold around the fixed perforate partition. The increase in cross-sectional area of the tapered manifold also aids in maintaining a uniform flow through the catalyst retaining section 45. Of course, after the fluid stream leaves the manifold it is directed around the space defined by the closed end of the fixed perforate partition and the outer housing into opening 17 and through conduit 18.

It is to be noted that by utilizing the converter in this way the general flow of the fluid is from in-to-out and from top to bottom. This is considered a preferred flow arrangement for it not only conserves the sensible heat level, since the incoming fluid first contacts the smaller of the two perforate partitions, but the downward flow will prevent the catalyst material within the catalyst retaining section from floating. Floating has a tendency to cause mechanical attrition of the catalyst particles. The use of the converter in this way should not be limiting upon this present embodiment for it is susceptible to being used in an out-to-in flow arrangement. Of course, since the pressuring means is weight, to operate correctly the converter of FIG. 1 must be vertically disposed with the flanged portion 33 on the top.

Figure 2:
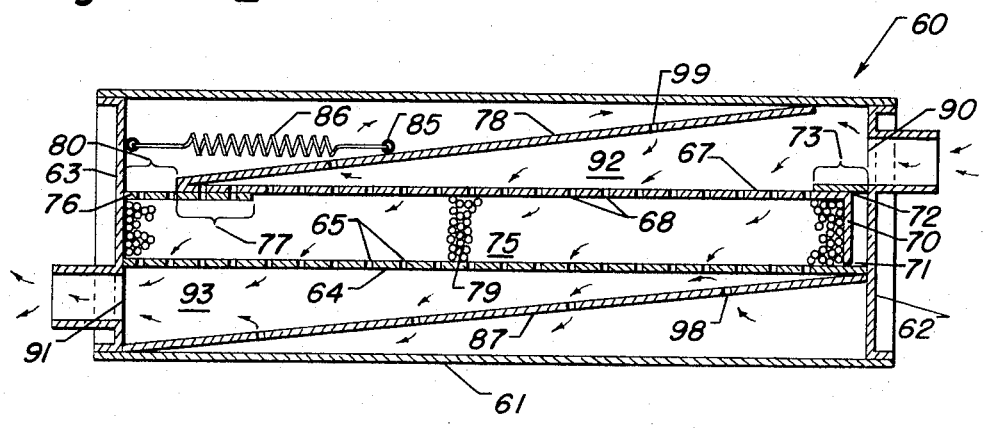
FIG. 2 of the drawing is a sectional elevational view through a modified embodiment of the converter of this present invention.

FIG. 2 is a schematical representation of an alternative embodiment of the present improvement, which is not symmetrical in shape. Referring to FIG. 2 in detail, the converter is shown to include an outer housing 60 which has an elongated rectangularly shaped tubular section 61, to which are connected end closure sections 62 and 63, respectively. It is noted that end sections 62 and 63 are designed similarly to sections 3 and 4 of FIG. 1. That is, they have flanged ends to permit various types of connections. Within outer housing 60 is a fixed perforate partition 64 having perforations or apertures 65 therethrough. Partition 64 may be attached to the outer housing in various ways. In other words, it may be welded along the entire interior of housing 60 or it may be welded at one end and supported at the other edges via grooves, thereby providing a rigid but slideable fit. The slideable fit is preferred, since it permits independent expansion of the partition. Also within the outer housing is the movable perforate partition 67 with the apertures or openings 68 therethrough. As was the case in the embodiment of FIG. 1, this movable partition 67 has a flanged end 70 which extends adjacent to the fixed perforate partition at 71. A fixed blocking partition 72 is disposed adjacent to the movable perforate partition 67 in proximity to the flanged end. This blocking partition overlaps a portion 73 of the movable perforate partition to thereby block flow of fluids through that portion. Thus, in effect, a reservoir of catalyst material is formed at that end of the catalyst retaining section. The perforate partitions as well as the blocking partition may extend to the side of the housing 60. If that be the case, the housing itself will serve as part of the end closure means. To completely enclose the catalyst retaining section 75, a fixed perforate closure partition 76 is attached to the outer housing and disposed adjacent the movable perforate partition 67 to overlap the movable perforate partion over a portion 77. As was the case in the embodiment illustrated in FIG. 1, this perforate closure partition may be imperforate if desired. Of course, located within catalyst retaining section 75 is catalyst material 79.

The movable perforate partition in this embodiment has a transverse portion 78 extending from the perforate face of the catalyst retaining section to prevent flow of fluids through portion 80 of the fixed closure perforate partition. Transverse portion 78 also serves as a means to vary the cross-sectional area of passageway 92. As shown in FIG. 2, portion 78 extends completely to housing 60 and is movable thereon. Attached to portion 78 at 85 is a tension spring 86 which in turn is attached to end section 63 of the housing. The tension spring serves as the pressuring means to maintain the flanged portion 70 in pressure contact with the catalyst material within catalyst retaining section 75. Tension spring 86 may be complemented with adjustment means (not shown) which could be used for varying the tension or the pressure on the catalyst material within the catalyst retaining section 75. On the opposite side of the catalyst retaining section is located a distribution plate 87 which varies the cross-sectional area of passageway 93. Ports 90 and 91 are located in end sections 62 and 63, respectively, to provide communication into the interior of housing 60.

As is, the converter may be used with the incoming fluid coming through port 90 or with the incoming fluid coming through port 91. For sake of simplicity, it is assumed that the fluid enters through port 90; then as the fluid passes through port 90 it enters a passageway or manifold 92 which is defined by the face of the perforate partition 75 and by the face of portion 78 of movable partition 67. Since passageway 92 decreases in cross-sectional area in the direction of flow, the velocity head of the incoming fluid will develop into a uniform pressure head across the face of the catalyst retaining section. The uniform pressure head will also be effectuated by the fact that the passageway 93 defined by plate 87 and the opposite face of the retaining section is increasing in cross-sectional area in the direction of flow. Thus, the uniform pressure head will create uniform flow through the catalyst material in catalyst retaining section 75. As "shrinkage," attrition, or chemical spallation reduces the volume of catalyst material within the retaining section 75, the flanged portion of perforate plate 67 will be moved by the action of spring 86 to compact the catalyst material and thus prevent any bypass. Actually, new material or fresh catalyst particles within the reservoir section will actually be introduced to contact the flow of fluids. Also as was the case in the embodiment of FIG. 1, since the movable partition 67 is moving at the same time as flanged portion 70 the overlapped portion 77 of fixed closure partition 76 will become larger. Since in this embodiment the fixed closure partition 76 is perforated, the perforations in plate 67 will be exposed to more perforations in plate 76. Thus, the effective size of the catalyst retaining section 75 becomes greater as particles are lost. It is to be noted that portion 78 and plate 87 have spaced apart openings 99 and 98 provided therein. These openings are utilized to create a muffling effect within the converter. Thus, the converter will serve as a muffler when utilized on the exhaust stream of an internal combustion exhaust engine.

From the foregoing description, it is seen that this particular converter is of such a design that little or no bypass of fluids will occur when catalyst material is lost. It is also seen that since the catalyst reservoir is not defined by a perforated plate, it in itself will not cause mechanical breakdown or crushing of catalyst materials. In addition, it is to be noted that the particular converter may be constructed in such a manner that the various components will be capable of expanding and contracting relative to each other as the temperature of the apparatus rises. Also, it is seen that in the embodiments of FIG. 1 and FIG. 2, as catalyst is lost the actual size of the catalyst retaining section becomes greater.

It is desirable that the components within the converter be made of lightweight relatively thin gauge material, whether of ordinary steel or an alloy, such that the assembly is relatively lightweight and such that the temperature effects may also be accommodated by some material flucture without causing breakage of seams and joints. The material used should also be of a character that is able to withstand the high temperatures that may result from the operation of a converter.

It is also considered as within the scope of this present improved design and construction to provide for a covering of the outer walls of the converter with a suitable insulation material, such as asbestos, mineral wool, or the like in order to maintain the maximum amount of heat within the catalyst retaining section. Also considered within the scope of this invention is the provision of a fill plug for access to the catalyst retaining section. It may well be understood that various minor modifications in design and/or location of the various portions of this converter may be made without diverting from the scope of the present invention. For example, there may be a variation in the shape and spacing of the various sections from that as indicated on the drawing, or in locating and designing the outlet and inlet means. The apertures located on the perforate sections will, of course, be sized in relation to the size of the catalyst particles which are to be maintained within the apparatus.

We claim as our invention:
1. A converter for catalytic conversion of a fluid stream comprising in combination:
   (a) an outer housing;
   (b) a fixed perforate partition disposed within said outer housing;
   (c) a movable perforate partition spaced from said fixed perforate partition and having at least one flanged end thereon, which extends adjacent to said fixed perforate partition;
   (d) a fixed blocking partition disposed adjacent said movable perforate partition in proximity to said flanged end, said fixed blocking partition overlapping a portion of said movable perforate partition to thereby block flow of said fluids through the overlapped portion thereof;
   (e) end closure means for the space encompassed between said perforate partitions to define a catalyst retaining section adapted to hold catalyst particles;
   (f) fluid inlet passageway means into said housing and into communication with one perforate face of said catalyst section and a fluid outlet passageway means from said housing in communication with the opposing perforate face of said catalyst retaining section; and,
   (g) pressuring means contacting said movable perforate partition to maintain said flanged end in pressure contact with said catalyst material, whereby said catalyst material is maintained in a compacted state.

2. The converter of claim 1 further characterized in that:
   (a) said outer housing is frustra-conically shaped;
   (b) said fixed perforate partition is cylindrically shaped and is spaced coaxially within said outer housing to form a tapered annular manifold therebetween which serves as part of one of said passageway means;
   (c) said movable perforate partition is cylindrically shaped and is disposed coaxially within said fixed perforate partition; and,
   (d) said fixed blocking partition is cylindrically shaped and is disposed coaxially within said movable perforate partition.

3. The converter of claim 2 further characterized in that said end closure means comprises in part a fixed cylindrically shaped perforate closure partition coaxially disposed around said movable perforate partition to overlap the latter on an end opposite said flanged end and in that the end opposite said flanged end of said movable perforate partition is closed to thereby prevent flow of fluids through the portion of the fixed closure perforate partition not overlapping the movable perforate partition.

4. The converter of claim 1 further characterized in that said end closure means comprises in part a fixed perforate closure partition disposed adjacent said movable perforate partition and overlapping the latter on an end opposite said flanged end and on the opposite side thereof, and in that said movable perforate partition has a transverse portion extending from the perforate face of the catalyst section to prevent flow of fluids through the portion of the fixed closure perforate partition not overlapping the movable perforate partition.

5. The converter of claim 1 further characterized in that said converter is substantially vertically disposed having the flanged end of said movable perforate partition positioned at the top, whereby the weight of said movable perforate partition serves as said pressuring means.

6. The converter of claim 1 further characterized in that said converter is substantially vertically disposed having the flanged end of said movable perforate partition positioned at the top and in that a weighted distribution means is provided in one of said passageway means connecting to said movable perforate partition for establishing uniform fluid distribution through said catalyst section, and in that said weighted distribution means serves as part of said pressuring means.

7. The converter of claim 1 further characterized in that said pressuring means comprises a spring contacting said outer housing and said movable perforate partition, said spring being biased to maintain said flanged end in pressure contact with said catalyst material.

References Cited

UNITED STATES PATENTS

| | | | |
|---|---|---|---|
| 991,861 | 5/1911 | Lemberg | 23—288.3F |
| 3,041,149 | 6/1962 | Houdry | 23—288.3F |
| 3,197,287 | 7/1965 | Innes et al. | 23—288.3F |
| 3,290,121 | 12/1966 | Malkiewicz | 23—288.3F |
| 3,355,258 | 11/1967 | Thomas | 23—288.3F |
| 3,421,826 | 1/1969 | Tope et al. | 23—288.3FX |

JOSEPH SCOVRONEK, Primary Examiner

U.S. Cl. X.R.

181—36, 59